(12) United States Patent
Rajendraprasad

(10) Patent No.: US 8,804,215 B2
(45) Date of Patent: Aug. 12, 2014

(54) IMAGE INPUT TERMINAL HAVING WEIGHING PLATEN

(75) Inventor: Vinuprasad Rajendraprasad, Wilsonville, OR (US)

(73) Assignee: Xerox Corporation, Norwalk, CT (US)

( * ) Notice: Subject to any disclaimer, the term of this patent is extended or adjusted under 35 U.S.C. 154(b) by 180 days.

(21) Appl. No.: 13/364,464

(22) Filed: Feb. 2, 2012

(65) Prior Publication Data

US 2013/0201502 A1  Aug. 8, 2013

(51) Int. Cl.
*H04N 1/04* (2006.01)
*G06K 15/02* (2006.01)

(52) U.S. Cl.
USPC ......... 358/505; 358/497; 358/1.18; 358/1.13; 177/25.13

(58) Field of Classification Search
None
See application file for complete search history.

(56) References Cited

U.S. PATENT DOCUMENTS

| | | | |
|---|---|---|---|
| 4,716,281 A | 12/1987 | Amacher et al. | |
| 4,779,706 A | 10/1988 | Mergenthaler | |
| 5,125,465 A | 6/1992 | Schneider | |
| 5,139,100 A | 8/1992 | Brauneis | |
| 5,410,108 A | 4/1995 | Williams et al. | |
| 6,032,004 A | 2/2000 | Mirabella, Jr. et al. | |
| 6,080,937 A * | 6/2000 | Korthauer et al. | 177/2 |
| 6,237,852 B1 | 5/2001 | Svetal et al. | |
| 2001/0040706 A1* | 11/2001 | Kirita | 358/474 |
| 2010/0259790 A1* | 10/2010 | Pagel | 358/1.15 |
| 2010/0268659 A1* | 10/2010 | Zimberoff et al. | 705/336 |
| 2012/0002249 A1* | 1/2012 | Kim | 358/475 |

\* cited by examiner

*Primary Examiner* — Tammy Pham
*Assistant Examiner* — Keara Harris
(74) *Attorney, Agent, or Firm* — Gibb & Riley, LLC

(57) ABSTRACT

A scanner apparatus comprises a transparent platen having a top side and a bottom side opposite the top side, and an optical sensor unit positioned adjacent the bottom side of the transparent platen. The optical sensor unit scans an image of at least one item placed on the top side of the platen to produce an electronic scanned image of the item. Further, a weight sensor unit is connected to the transparent platen. The weight sensor unit senses the weight of the item placed on the top side of the platen to produce an item weight. A processor is operatively connected to the optical sensor unit and to the weight sensor unit. The processor combines the electronic scanned image of the item and the item weight to produce image and weight data, and the processor outputs the image and weight data.

20 Claims, 3 Drawing Sheets

IMAGE INPUT TERMINAL HAVING WEIGHING PLATEN

BACKGROUND

Embodiments herein generally relate to printing devices, such as multifunction devices and modular devices and, more particularly to such devices that include an image input terminal, document handler, or other device having a scanner that produces a scanned image.

The image input terminal (IIT) or scanner integrated with printers is currently used for the function of scanning documents or other materials, such as magazines or books. Extensive bulk and hardware configurations burden all such products, herein called multifunction printers (MFPs), with size, weight and costs that encourage extra functionality to make the product more versatile and functional for customers. The IIT is integrated with the printer such that control panel commands and display screen information is exchanged and images and files can be sent via wired or wireless means to other devices. This hardware, integration and information capable system offers an unrealized opportunity for additional functionality that is suggested with the present concept of a specialized MFP.

SUMMARY

The devices and systems herein incorporate an object weight measurement unit into the horizontal platen structure of a document scanner used in MFP imaging products. These devices and systems address the need for convenient shipping package weighing and product and system/subsystem weighing in design, engineering and laboratory environments where weight information may be displayed on digital control panel displays and manually or automatically inserted into preloaded printout data, labels, bill of materials, etc., and then printed, emailed or faxed per application objectives and set up. The scanner weighing integration enables scans of the object to be included or inserted in files and printed documents.

Therefore, an exemplary printer apparatus herein includes a transparent platen having a top side and a bottom side opposite the top side. An optical sensor unit is positioned adjacent the bottom side of the transparent platen. The optical sensor unit scans, through the transparent platen, an image of at least one item placed on the top side of the platen to produce an electronic scanned image of the item. Further, the optical sensor unit can optionally determine the location of the item on the platen to produce an offset measure.

A weight sensor unit is connected to the transparent platen. The weight sensor unit senses the weight of the item placed on the top side of the platen based on measurements of a change of the platen (and optionally based on an offset measure of the position of the item on the platen) to produce an item weight. Further, a processor is operatively connected to the optical sensor unit and to the weight sensor unit. The processor combines the electronic scanned image of the item and the item weight to produce image and weight data. The processor can merge the image and weight data into a template to produce a label. Also, a printing engine is operatively connected to the processor, and the printing engine is used to print the label and the electronic scanned image of the item.

Various embodiments may include a document handler adjacent the top side of the platen. The document handler feeds items past the platen to sequentially place and remove multiple items on and from the platen. The processor can aggregate multiple electronic scanned images output by the optical sensor unit and multiple item weights output by the weight sensor unit into a single file of the images and combined weight data. In further embodiments, the processor can calculate a processing cost for the item based on the item weight, and the processor can include the processing cost in the image and weight data.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

The devices and systems disclosed herein provide a more efficient and automated way to obtain weight and scan images of objects being weighed, which is particularly useful for objects that require a printout that includes weight information in some pre-established format or preprinted form, such as shipping forms, bills of materials and postage or shipping forms. This devices and systems are integrated into general purpose MFPs, and into specialized products where such features increase marketability in appropriate environments. The devices and systems disclosed herein offer the combined functionality of being able to weigh an object such as a shipping box, scan it, and produce a shipping document all with one device.

Figure 1:
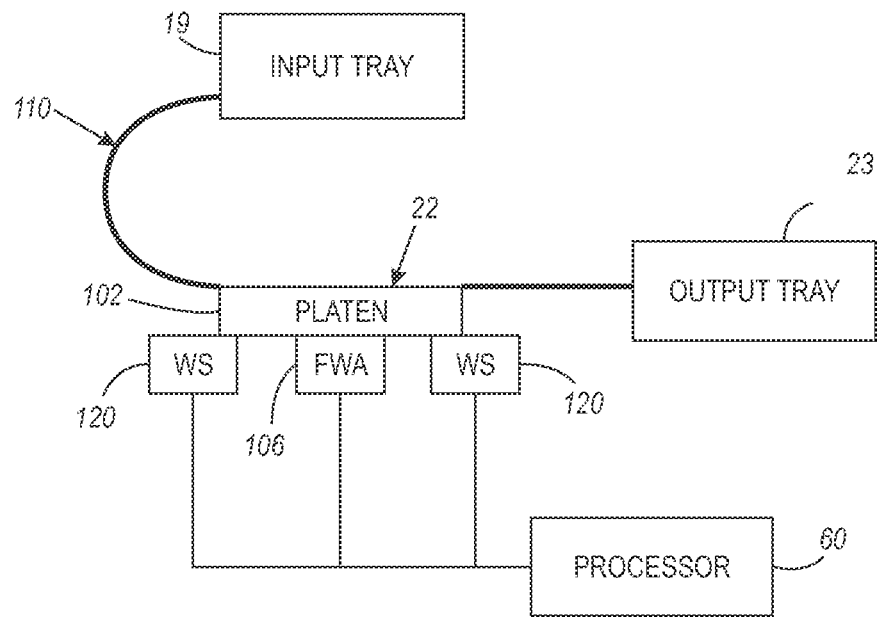
FIG. 1 is a side-view schematic diagram of a device according to embodiments herein.

As shown, for example in FIG. 1, with the devices and systems herein, the glass platen 102 is coupled to the scanner structure 106 (such as a full width array (FWA) scanner bar or any other scanner structure) with small deflection enabled mounts (identified as weight sensors (WS) 120 in the drawings) that house and connect weight measurement capable sensors. Objects with weight sufficient to overcome a bias force act on the weight measurement sensors 120 to alter signals sent to a controller/processor 60 for weight equivalent conversion. Calibration can be employed to ensure sufficient accuracy and scale over the intended weighing range. Bias mounts 120 enable normal platen 102 use and auto document feed scan methods that are the equivalent of standard scanner functions.

As explained in greater detail below with reference to FIG. 6, the scanning structure 22 can be used in a larger overall structure, such as a multi-function printing device, an image input terminal of a modular printing device, a standalone scanner, etc. As shown conceptually in FIG. 1, in a document handler, documents are fed from an input tray 19 along a paper path 110 by a platen 102 into an output tray 23. In this way, the document handler passes one or more items over the platen 102. These items are scanned with the optical scanner 106 and the digital scanned images and weights obtained thereby are processed/stored by the processor 60.

Figure 2:
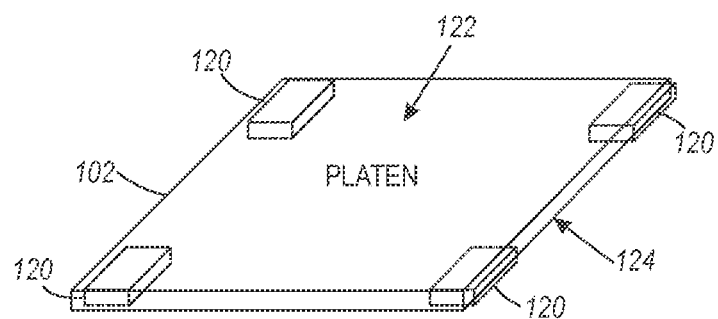
FIG. 2 is a perspective-view schematic diagram of a device according to embodiments herein.

FIG. 2 illustrates one example of an arrangement of weight sensor units 120 positioned on the arbitrarily named bottom 124 of platen 102 (which is opposite the arbitrarily named top 122 of the platen 102). In the drawings, items 140 (see FIG. 5) are placed on the top 122 of the platen. In this example, a weight sensor unit 120 is located at each corner of the platen 102. Those ordinarily skilled in the art would understand that more or less weight sensor units 120 could be utilized. For example, an additional weight sensor unit 120 could be utilized in the very center of the platen 102 and; alternatively, a single weight sensor unit 120 could be utilized (again, for example, in the very center of the platen).

Weight measurement requirements are targeted to maximum limits practical at resolutions deemed appropriate based on market research and customer applications. Therefore, weight sensors could weigh any values from milligrams to kilograms, depending upon customer application. Scanner platen glass 102 weight, strength as well as functional area are designed to accommodate objects expected to be weighed. Platen glass 102 thickness and support frame structures can be optimized to accommodate even large and heavy objects and shipping packages within specialized equipment and shipping devices.

Different deflection configurations are provided in different embodiments herein to provide a weight measure. For example, the structure illustrated in FIG. 2 senses the additional pressure that an item placed on the top 122 of the platen 102 exerts on one or more of the weight sensor units 120. The processor 60 can calculate the weight of the item 140 based upon inputs from multiple weight sensor units 120 through proration, average, maximum measured weights, etc.

Figure 3:
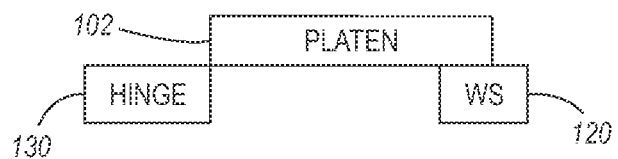
FIG. 3 is a side-view schematic diagram of a device according to embodiments herein.
Figure 4:
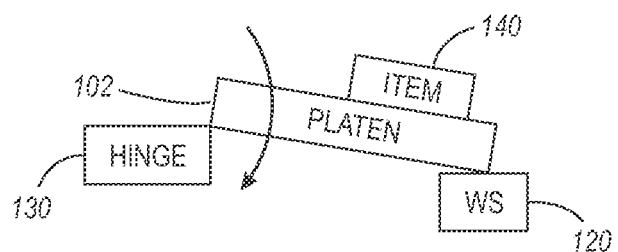
FIG. 4 is a side-view schematic diagram of a device according to embodiments herein.
Figure 5:
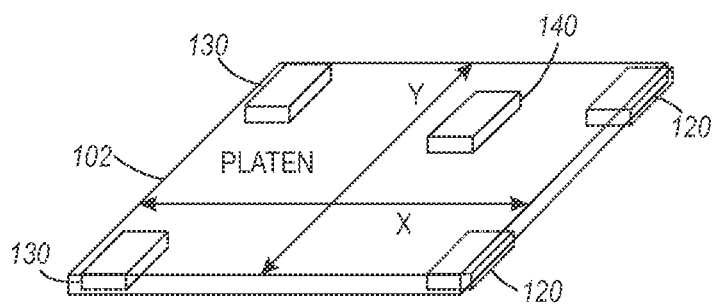
FIG. 5 is a perspective-view schematic diagram of a device according to embodiments herein.

Another configuration is illustrated in FIGS. 3-5. These structures include a hinge 130 potentially in combination with one or more weight sensor units 120. The hinge 130 can be a simple mechanical hinge that allows the platen 102 to rotate downward as shown in FIG. 4 when an item 140 is placed on the platen 102. Alternatively, the hinge 130 can include a sensor to detect the amount of rotation the platen 102 experiences as the item 140 is placed on the platen 102 (this could avoid the need to use the additional weight sensor unit 120 and, instead, in this example, item 120 could represent a biasing unit that biases the platen 102 toward a starting position (parallel position to the paper path 110)).

Thus, at least one structure presented herein utilizes a full platen deflection structure that allows displacement of the entire glass panel 102 (FIG. 2). Measurement of the movement of the full platen 102 is translated into a weight measure (based on angular deflection amounts and/or weight sensed by the weight sensors). Thus, an exemplary structure presented herein in FIGS. 3-4 utilizes a pivot mount (hinge) 130 located at one of the sides of platen 102 and the structures herein measure changes in the angle of the platen 102 with respect to a starting position to provide information that is translated into a weight measure. However, because the distance between the pivot mount 130 and the item 140 on the platen 102 will affect the moment-arm of force applied by the item 140, the scanner can be used to determine the placement offset of the item 140 from the pivot mount to more accurately provide weight measurement. For example, as shown in FIG. 5, the optical sensor unit 106 can determine the X-Y coordinate of the item 140. This information is then supplied to the processor 60. With the positional information of the item 140, processor 60 compensates for the distance the item 140 is from the hinge 130 and/or the weight sensor unit 120 in providing a corrected weight of the item 140. Therefore, by incorporating a calculation of the moment-arm caused by placement offset of the item 140 on the platen 102, the devices herein provide weight measurements that remain accurate even with asymmetrical object shapes being measured and/or when the operator places a package in an offset manner.

The devices 130 utilized in establishing weight measurement can include load cells, spring loading where deflections against quantified spring forces are measured by devices such as optical scales, materials such as conductive foam that experience a change in electrical resistance based on degree of compression, force sensing resistors, etc., as well as any such weighing structures that are developed in the future.

The practical application of such structures and methods is very broad. For example, a user may supply a shipping address in a print job, the item(s) can be weighed by the platen, and a complete shipping label (including postage) can be printed for the item(s). Thus, multiple sheets and an envelope (into which the sheets will be placed for mailing) can be automatically passed over the platen by a document handler, and a combined weight of such items can be determined by the processor to calculate the correct postage for the envelope. Such calculated postage can then be printed on a label or the envelope.

In another example, an item with a shipping address already in place can be placed on the platen. The shipping address can be scanned (and optical character recognition (OCR) can be performed) while the item is weighted, and the processor can calculate the correct postage depending upon the weight of the item and the item's destination (and/or the shipping method (overnight, $2^{nd}$ day air, etc.)) obtained from the OCR information scanned.

In addition, with embodiments herein, the shipping or other label that is produced by these systems and methods can include a printed image of the item that is within the package, based on the scan of the item that was made when the item was weighed. This allows the shipper, customer, government agent, auditor, etc., to confirm (or at least view a printed image of) what is within a package or envelope, without having to open the package or envelope. Thus, in this example, multiple covers of books could be printed on the shipping label, and a customer could immediately decide whether to accept shipment or reject shipment, depending upon whether their book order was correctly packed by the shipper, without having to unpack and eventually repack the container of books. Similarly, custom agents and auditors could confirm the contents of a container if the weight of the container matches a known weight of the item that the image represents (once the estimated weight of the container and packing material is taken into consideration).

Similarly, within a warehousing example, information printed on the exterior of items (part numbers, names, classification codes, dates, serial numbers, etc.) can be scanned (and OCR can be performed) while the item is weighed. From such information the processor can determine if the item is correctly labeled (if the OCR recognized identification of the item matches a known weight for the item), how many of such items are in a container, whether the storage shelving can accommodate the weight of the item, what type of transport should be used to transport the item to the storage location based on its weight, etc.

Further, storing the scanned image data with a weight measure provides the ability to provide the user with various estimates at any point in the future. For example, the user could be provided shipping cost estimates to different destinations (and for different shipping methods) at any point in the future, based on the stored weight/scanned data, allowing the user to make a decision whether to print and ship the item. The user could be provided information regarding the type and cost of binding materials that would be required to bind the printed items having a certain weight at any point in the future, based on the stored weight/scanned data. In addition, the stored weight/scanned image could let a user know whether an item that was scanned in the past was an original (if it matched a known original weight) or a reproduction (if it was different from the known original weight). Those ordinarily skilled in the art would understand that the foregoing presents merely limited examples, and that the structures and methods herein are not limited to these examples, but are applicable to many more diverse situations.

Figure 6:
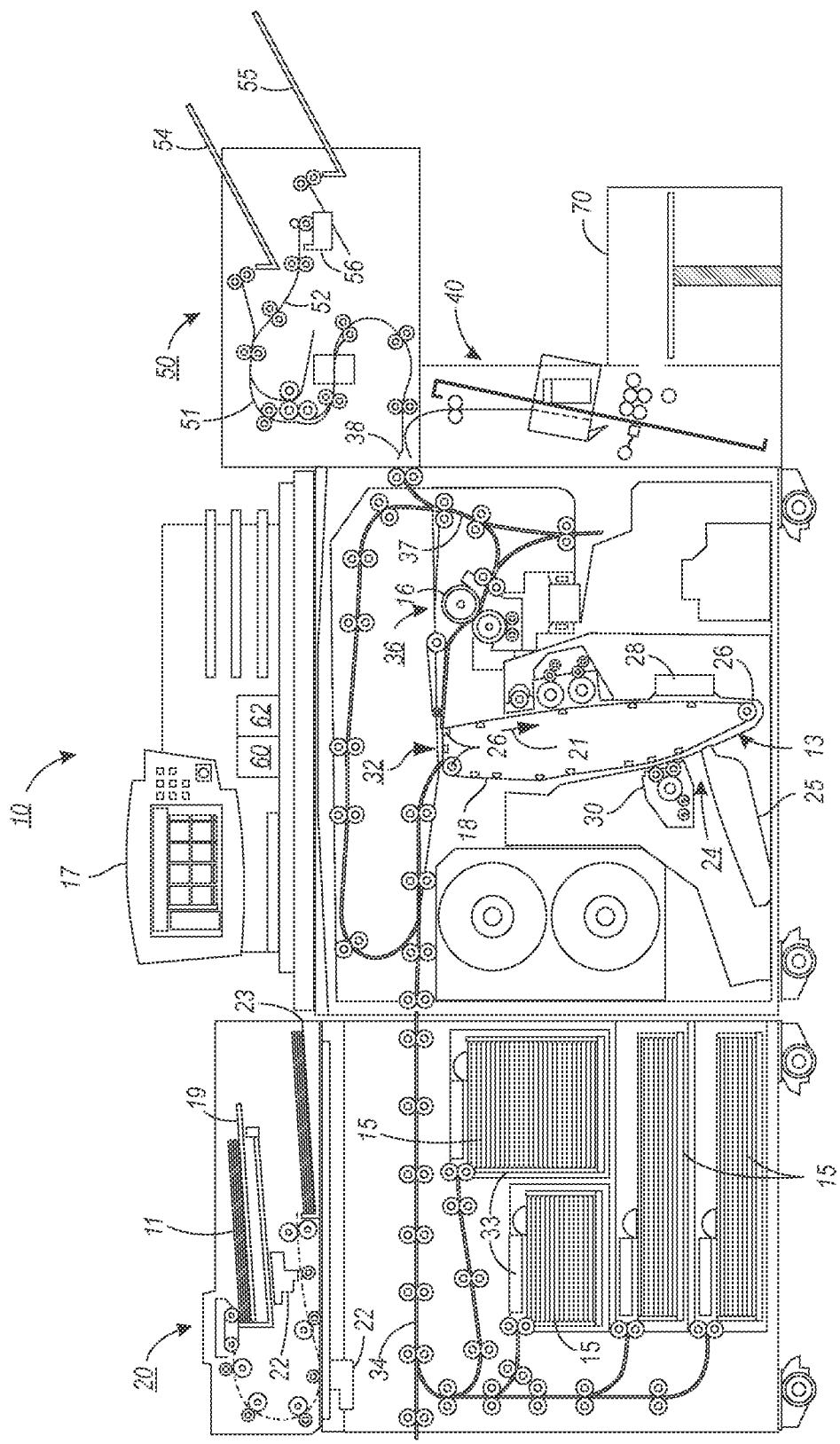
FIG. 6 is a side-view schematic diagram of a device according to embodiments herein.

Referring to FIG. 6 a printing machine 10 is shown that includes an automatic document feeder 20 (ADF) that can be used to scan (at a scanning station 22) original documents 11 fed from a tray 19 to a tray 23. The user may enter the desired printing and finishing instructions through the graphic user interface (GUI) or control panel 17, or use a job ticket, an electronic print job description from a remote source, etc. The control panel 17 can include one or more processors 60, power supplies, as well as storage devices 62 storing programs of instructions that are readable by the processors 60 for performing the various functions described herein. The storage devices 62 can comprise, for example, non-volatile storage mediums including magnetic devices, optical devices, capacitor-based devices, etc.

An electronic or optical image or an image of an original document or set of documents to be reproduced may be projected or scanned onto a charged surface 13 or a photoreceptor belt 18 to form an electrostatic latent image. The belt photoreceptor 18 here is mounted on a set of rollers 26. At least one of the rollers is driven to move the photoreceptor in the direction indicated by arrow 21 past the various other known electrostatic processing stations including a charging station 28, imaging station 24 (for a raster scan laser system 25), developing station 30, and transfer station 32.

Thus, the latent image is developed with developing material to form a toner image corresponding to the latent image. More specifically, a sheet 15 is fed from a selected paper tray supply 33 to a sheet transport 34 for travel to the transfer station 32. There, the toned image is electrostatically transferred to a final print media material 15, to which it may be permanently fixed by a fusing device 16. The sheet is stripped from the photoreceptor 18 and conveyed to a fusing station 36 having fusing device 16 where the toner image is fused to the sheet. A guide can be applied to the substrate 15 to lead it away from the fuser roll. After separating from the fuser roll, the substrate 15 is then transported by a sheet output transport 37 to output trays a multi-function finishing station 50.

Printed sheets 15 from the printer 10 can be accepted at an entry port 38 and directed to multiple paths and output trays 54, 55 for printed sheets, corresponding to different desired actions, such as stapling, hole-punching and C or Z-folding. The finisher 50 can also optionally include, for example, a modular booklet maker 40 although those ordinarily skilled in the art would understand that the finisher 50 could comprise any functional unit, and that the modular booklet maker 40 is merely shown as one example. The finished booklets are collected in a stacker 70. It is to be understood that various rollers and other devices which contact and handle sheets within finisher module 50 are driven by various motors, solenoids and other electromechanical devices (not shown), under a control system, such as including the microprocessor 60 of the control panel 17 or elsewhere, in a manner generally familiar in the art.

Thus, the multi-functional finisher 50 has a top tray 54 and a main tray 55 and a folding and booklet making section 40 that adds stapled and unstapled booklet making, and single sheet C-fold and Z-fold capabilities. The top tray 54 is used as a purge destination, as well as, a destination for the simplest of jobs that require no finishing and no collated stacking. The main tray 55 can have, for example, a pair of pass-through sheet upside down staplers 56 and is used for most jobs that require stacking or stapling.

As are understood by those ordinarily skilled in the art, the printing device 10 shown in FIG. 6 is only one example and the embodiments herein are equally applicable to other types of printing devices that may include fewer components or more components. For example, while a limited number of printing engines and paper paths are illustrated in FIG. 6, those ordinarily skilled in the art would understand that many more paper paths and additional printing engines are included within any printing device used with embodiments herein.

Therefore, an exemplary printer apparatus 10 herein includes a transparent platen 102 having a top side 122 and a bottom side 124 opposite the top side 122. An optical sensor unit 106 is positioned adjacent the bottom side 124 of the transparent platen 102. The optical sensor unit 106 scans, through the transparent platen 102, an image of at least one item 140 placed on the top side 122 of the platen 102 to produce an electronic scanned image of the item 140. Further, the optical sensor unit 106 can optionally determine the location of the item 140 on the platen 102 to produce an offset measure.

At least one weight sensor unit 120/130 is connected to the transparent platen 102. The weight sensor unit 120 senses the weight of the item 140 placed on the top side of the platen 102 based on measurements of a change of the platen 102 (and optionally based on the offset measure) to produce the item weight. Further, a processor 60 is operatively connected to the optical sensor unit 106 and to the weight sensor unit 120. The processor 60 combines the electronic scanned image of the item 140 and the item weight to produce "image and weight data." The processor 60 can merge the image and weight data into a template to produce a label. Also, a printing engine is operatively connected to the processor 60, and the printing engine is used to print the label (having addresses, bar codes, postage, the scanned image, etc.) and the electronic scanned image of the item 140.

Various embodiments may include a document handler adjacent the top side of the platen 102. The document handler feeds items past the platen 102 to sequentially place and remove multiple items on and from the platen 102. The processor 60 can aggregate multiple electronic scanned images output by the optical sensor unit 106 and multiple item weights output by the weight sensor unit 120 into a single file of the image and weight data. In further embodiments, the processor 60 can calculate a processing cost for the item 140 based on the item 140 weight, and the processor 60 can including the processing cost in the image and weight data and print the same on the label.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A scanner apparatus comprising:
   a transparent platen having a top side and a bottom side opposite said top side;
   an optical sensor unit positioned adjacent said bottom side of said transparent platen, said optical sensor unit scanning an image of an item placed on said top side of said platen to produce an electronic scanned image of said item;
   a weight sensor unit connected to said transparent platen, said weight sensor unit sensing a weight of said item placed on said top side of said platen to produce an item weight, said weight sensor unit sensing said weight of said item while said optical sensor unit scans said image of said item; and
   a processor operatively connected to said optical sensor unit and to said weight sensor unit, said processor combining said electronic scanned image of said item and said item weight to produce image and weight data, and said processor outputting said image and weight data.

2. The scanner apparatus according to claim 1, said processor aggregating multiple electronic scanned images output by said optical sensor unit and multiple item weights output by said weight sensor unit into said image and weight data.

3. The scanner apparatus according to claim 1, further comprising a document handler adjacent said top side of said platen, said document handler sequentially placing and removing multiple ones of said item on and from said platen, said processor aggregating multiple electronic scanned images output by said optical sensor unit and multiple item weights output by said weight sensor unit into said image and weight data.

4. The scanner apparatus according to claim 1, said processor calculating a processing cost for said item based on said item weight, and said processor including said processing cost in said image and weight data.

5. The scanner apparatus according to claim 1, said processor performing optical character recognition on said electronic scanned image.

6. A printer apparatus comprising:
   a transparent platen having a top side and a bottom side opposite said top side;
   an optical sensor unit positioned adjacent said bottom side of said transparent platen, said optical sensor unit scanning an image of an item placed on said top side of said platen to produce an electronic scanned image of said item, and said optical sensor unit determining a location of said item on said platen to produce an offset measure;
   a weight sensor unit connected to said transparent platen, said weight sensor unit sensing a weight of said item placed on said top side of said platen based on measurements of a change of said platen and on said offset measure to produce an item weight, said weight sensor unit sensing said weight of said item while said optical sensor unit scans said image of said item; and
   a processor operatively connected to said optical sensor unit and to said weight sensor unit, said processor combining said electronic scanned image of said item and said item weight to produce image and weight data, and said processor outputting said image and weight data.

7. The printer apparatus according to claim 6, said processor aggregating multiple electronic scanned images output by said optical sensor unit and multiple item weights output by said weight sensor unit into said image and weight data.

8. The printer apparatus according to claim 6, further comprising a document handler adjacent said top side of said platen, said document handler sequentially placing and removing multiple ones of said item on and from said platen, said processor aggregating multiple electronic scanned images output by said optical sensor unit and multiple item weights output by said weight sensor unit into said image and weight data.

9. The printer apparatus according to claim 6, said processor calculating a processing cost for said item based on said item weight, and said processor including said processing cost in said image and weight data.

10. The printer apparatus according to claim 6, said processor performing optical character recognition on said electronic scanned image.

11. A printer apparatus comprising:
    a transparent platen having a top side and a bottom side opposite said top side;
    an optical sensor unit positioned adjacent said bottom side of said transparent platen, said optical sensor unit scanning an image of an item placed on said top side of said platen to produce an electronic scanned image of said item;
    a weight sensor unit connected to said transparent platen, said weight sensor unit sensing a weight of said item placed on said top side of said platen to produce an item weight, said weight sensor unit sensing said weight of said item while said optical sensor unit scans said image of said item;
    a processor operatively connected to said optical sensor unit and to said weight sensor unit, said processor combining said electronic scanned image of said item and said item weight to produce image and weight data, and said processor merging said image and weight data into a template to produce a label; and a printing engine operatively connected to said processor, said printing engine printing said label.

12. The printer apparatus according to claim 11, said processor aggregating multiple electronic scanned images output by said optical sensor unit and multiple item weights output by said weight sensor unit into said image and weight data.

13. The printer apparatus according to claim 11, further comprising a document handler adjacent said top side of said platen, said document handler sequentially placing and removing multiple ones of said item on and from said platen, said processor aggregating multiple electronic scanned images output by said optical sensor unit and multiple item weights output by said weight sensor unit into said image and weight data.

14. The printer apparatus according to claim 11, said processor calculating a processing cost for said item based on said item weight, and said processor including said processing cost in said image and weight data.

15. The printer apparatus according to claim 11, said processor performing optical character recognition on said electronic scanned image.

16. A printer apparatus comprising:

a transparent platen having a top side and a bottom side opposite said top side;

an optical sensor unit positioned adjacent said bottom side of said transparent platen, said optical sensor unit scanning an image of an item placed on said top side of said platen to produce an electronic scanned image of said item, and said optical sensor unit determining a location of said item on said platen to produce an offset measure;

a weight sensor unit connected to said transparent platen, said weight sensor unit sensing a weight of said item placed on said top side of said platen based on measurements of a change of said platen and on said offset measure to produce an item weight, said weight sensor unit sensing said weight of said item while said optical sensor unit scans said image of said item;

a processor operatively connected to said optical sensor unit and to said weight sensor unit, said processor combining said electronic scanned image of said item and said item weight to produce image and weight data, and said processor merging said image and weight data into a template to produce a label; and a printing engine operatively connected to said processor, said printing engine printing said label, said label including said electronic scanned image of said item.

17. The printer apparatus according to claim 16, said processor aggregating multiple electronic scanned images output by said optical sensor unit and multiple item weights output by said weight sensor unit into said image and weight data.

18. The printer apparatus according to claim 16, further comprising a document handler adjacent said top side of said platen, said document handler sequentially placing and removing multiple ones of said item on and from said platen, said processor aggregating multiple electronic scanned images output by said optical sensor unit and multiple item weights output by said weight sensor unit into said image and weight data.

19. The printer apparatus according to claim 16, said processor calculating a processing cost for said item based on said item weight, and said processor including said processing cost in said image and weight data.

20. The printer apparatus according to claim 16, said processor performing optical character recognition on said electronic scanned image.

* * * * *